US008215194B2

(12) United States Patent
Hirai et al.

(10) Patent No.: US 8,215,194 B2
(45) Date of Patent: Jul. 10, 2012

(54) STARTER

(75) Inventors: Kensuke Hirai, Kariya (JP); Kazuhiro Andoh, Okazaki (JP)

(73) Assignee: Denso Corporation, Kariya (JP)

( * ) Notice: Subject to any disclaimer, the term of this patent is extended or adjusted under 35 U.S.C. 154(b) by 280 days.

(21) Appl. No.: 12/654,925

(22) Filed: Jan. 8, 2010

(65) Prior Publication Data
US 2010/0225189 A1    Sep. 9, 2010

(30) Foreign Application Priority Data

Mar. 6, 2009 (JP) ................................. 2009-053666

(51) Int. Cl.
F02N 11/00 (2006.01)
(52) U.S. Cl. .................................................. 74/6; 74/8
(58) Field of Classification Search .............. 74/6, 7 C, 74/8
See application file for complete search history.

(56) References Cited

U.S. PATENT DOCUMENTS

| | | | | | |
|---|---|---|---|---|---|
| 3,922,558 | A | * | 11/1975 | Hollyoak | 290/38 A |
| 3,955,427 | A | * | 5/1976 | Squires | 74/6 |
| 4,104,926 | A | * | 8/1978 | Wilson | 74/6 |
| 4,114,746 | A | * | 9/1978 | Usui et al. | 192/104 R |
| 4,296,342 | A | * | 10/1981 | Young et al. | 310/77 |
| 4,718,290 | A | * | 1/1988 | Murata et al. | 74/7 A |
| 4,958,530 | A | * | 9/1990 | Jaseck et al. | 74/7 A |
| 5,101,114 | A | * | 3/1992 | Isozumi et al. | 290/48 |
| 5,898,229 | A | | 4/1999 | Murata et al. | |
| 6,006,617 | A | * | 12/1999 | Pawlik | 74/7 A |

FOREIGN PATENT DOCUMENTS

| | | |
|---|---|---|
| JP | A-9-209890 | 8/1997 |
| JP | B2-3995549 | 10/2007 |

* cited by examiner

Primary Examiner — Burton Mullins
(74) Attorney, Agent, or Firm — Oliff & Berridge, PLC

(57) ABSTRACT

In a starter with which a pinion movable body with which a pinion gear and a one-way clutch were united moves on an output shaft, a holder is attached to the one-way clutch. A seal component having the shape of a ring is provided so that an end of an outer circumference of the seal component is fixed to a nose part of a housing and an end of an inner circumference of the seal component slidably contacts an outer circumferential surface of the holder. The holder is provided so that relative rotation to the one-way clutch is possible. Since the holder doesn't rotate relative to the housing, wear of a seal component is reduced compared with the case where the seal component contacts the one-way clutch which rapidly rotates whereby the sealability preventing a foreign substance or water from infiltrating into the inside of the starter can be maintained.

12 Claims, 4 Drawing Sheets

STARTER

CROSS REFERENCE TO RELATED APPLICATION

The present application relates to and incorporates by reference Japanese Patent application No. 2009-053666 filed on Mar. 6, 2009.

BACKGROUND OF THE INVENTION

1. Field of the Invention

The present invention relates to a starter whose pinion gear is pushed towards a ring gear of the engine side by the operation of an electromagnetic switch then engages with the ring gear whereby the engine is turned over.

2. Description of the Related Art

A starter which cranks an engine by engaging a pinion gear with a ring gear is conventionally known, where the ring gear is provided to a crankshaft of the engine and the pinion gear is pushed on an output shaft towards the ring gear by a gearshift driven by an electromagnetic switch.

The starter described in Japanese Patent Application Laid-Open No. 2003-176767 is an electromagnetic-push-in-type starter. In this type starter, a pinion movable body with which a pinion gear and a one-way clutch were united moves on an output shaft. In order to prevent a foreign substance or water from infiltrating into an inside of the starter from between a pinion movable body and inner circumferential surface of a nose part of a housing, the starter has a ring-shaped seal component in the inner circumferential surface of the nose part. An end of the outer diameter of the seal component is fixed to the inner circumferential surface of the nose part and an end of the inner diameter of the seal component slidably contacts to an outer circumferential surface whereby sealability is secured without restricting movement of the pinion movable body.

The pinion movable body is rotated in response to the torque of a motor at high speed at the time of an operation of the starter of the above-mentioned composition. However, since the seal component is fixed to the inner circumferential surface of the housing, the seal component is not rotated. For this reason, the seal component receives friction by rotation of the pinion movable body. Since the end of the outer diameter of the seal component becomes worn, there is concern that seal performance may deteriorate.

SUMMARY OF THE INVENTION

The present invention has been made in light of the above problems, and has an object to provide a starter whose durability and reliability is improved by reducing wear of a seal component.

In order to achieve the aforementioned object, there is provided a starter having a motor which generates torque by being energized, an output shaft which rotates in response to the torque of the motor, a pinion movable body which has a pinion gear provided on the output shaft so that axial movement is possible, a housing which accommodates the pinion movable body inside and a seal component which seals a gap between the pinion movable body and the housing. Cranking the engine is achieved by engaging a pinion gear, which has been pushed out on the output shaft, with a ring gear, wherein the pinion movable body has a holder whose rotation is restrained so that rotating speed of the holder is smaller than the rotating speed of the pinion gear. The holder is provided in the outer diameter side of the pinion movable body so that rotation relative to the pinion gear is possible and the seal component is interposed between an inner circumferential surface of the housing and an outer circumferential surface of the holder.

By interposing the seal component between the inner circumferential surface of the housing and the outer circumferential surface of the holder whose rotation is restrained so that the rotating speed of the holder is smaller than the rotating speed of the pinion gear, wear of the seal component can be greatly restricted compared with the case where the holder is not provided whereby the sealability preventing a foreign substance or water from infiltrating into the inside of the starter can be maintained for the long term, so that the durability and the reliability of the starter can be improved.

Preferably, with the starter of the present invention, the pinion movable body is driven by a gearshift to move on the output shaft in an axial direction, and a tip part of the gearshift contacts to the holder.

The gearshift drives an axial movement of the pinion movable body through the holder whereby wear of the tip part of the gearshift can be restricted compared with the case where the holder is not provided. For this reason, the pinion gear can uniformly contact to the ring gear, in addition, the durability of the gearshift is improved.

With the starter of the present invention, it is preferred that a baffle part is formed in a contact part of the holder and the gearshift and the tip part of the gearshift contacts to the contact part.

Accordingly, the contact part is caught in the tip part of the gearshift even if the holder begins rotation whereby rotation of the holder can be restrained. For this reason, wear of the seal component and the gearshift can be restricted.

Moreover, with the starter of this invention, it is also preferred that the holder comprises a convex part projected radially outwards, and in the inner circumferential surface of housing a groove part extends in the axial direction and the groove part engages with the convex part.

As a result, even if torque is transmitted to the holder, the groove part engages with the convex part whereby the holder is restrained so that relative rotation of the holder to the housing is impossible. Moreover, since the groove part extends in the axial direction, the convex part is allowed to move in the groove part in the axial direction whereby extrusion of the pinion movable body is not restricted.

Furthermore, preferably with the starter of this invention, the seal component is made to always seal the gap between the housing and the holder even when the pinion movable body moves in the direction of the output shaft.

Accordingly, sealability can be maintained regardless of the starter's operating state whereby infiltration of a foreign substance or water from the outside of the starter into the inside of the starter can be securely prevented.

In addition, as a result, it is preferred that the holder is made up of resin which has lubricity.

As a result, friction produced in relative rotation with the holder and a rotation part of the pinion movable body can be reduced. For this reason, wear of the holder can be reduced and durability of the holder can be secured. Moreover, in the case where the holder is attached with a snap fitting using elasticity, the holder can be attached smoothly.

DETAILED DESCRIPTION OF PREFERRED EMBODIMENTS

First Embodiment

Figure 2:
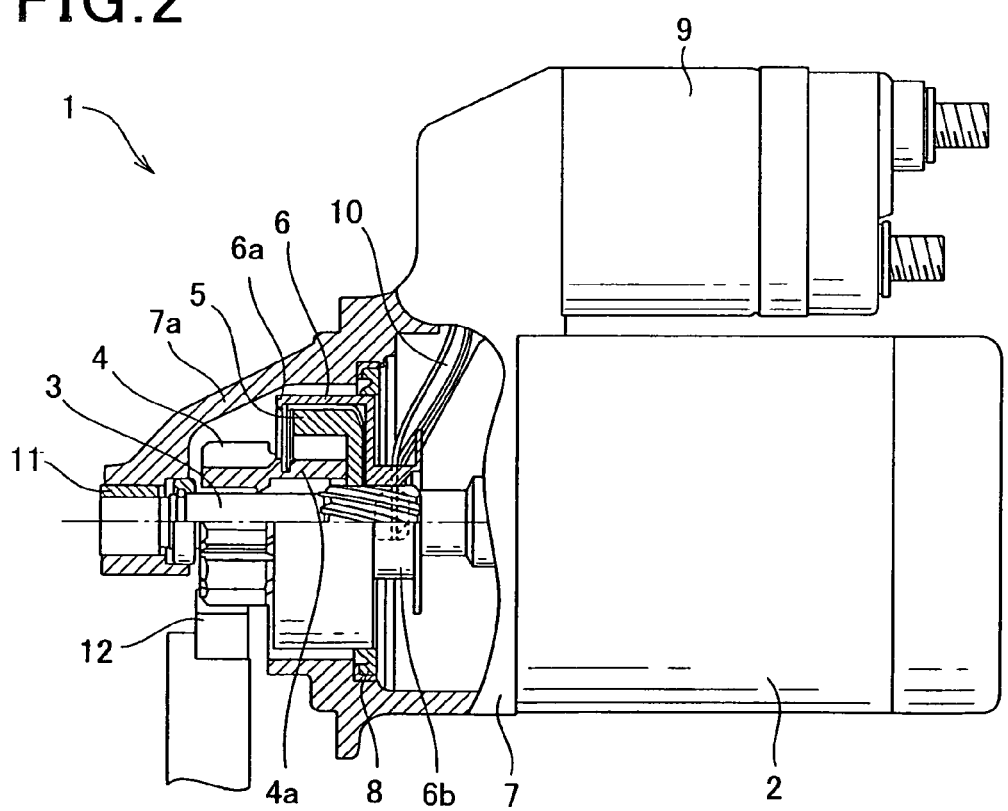
FIG. 2 is a sectional view at the time when the starter is in operation, according to the first embodiment of the present invention.
Figure 3:
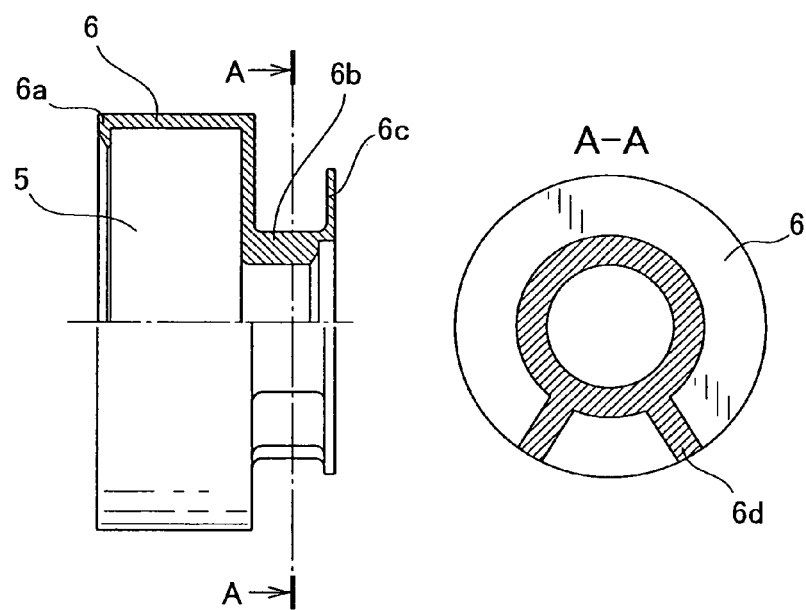
FIG. 3 is a sectional view and its A-A sectional view of the holder, according to the first embodiment of the present invention.

A first embodiment of a starter according to the present invention will be described with reference to the FIGS. 1-3.

Figure 1:
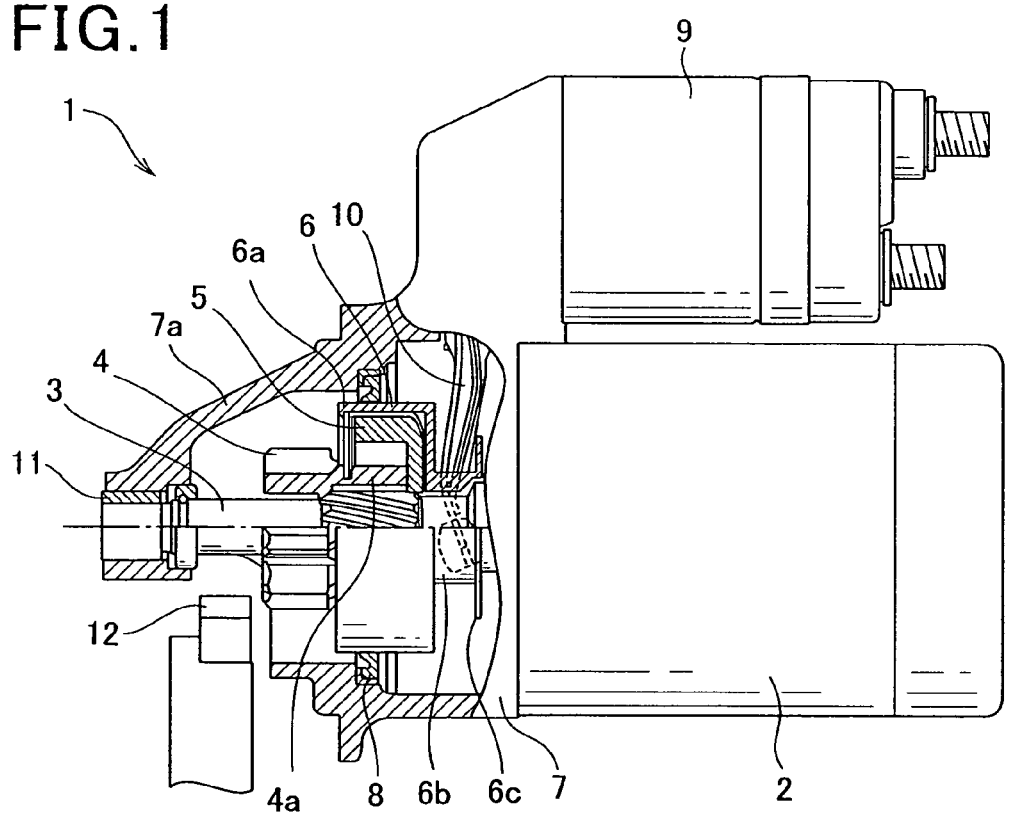
FIG. 1 is a sectional view at the time when the starter is not in operation, according to the first embodiment of the present invention.

As shown in FIG. 1, the starter 1 of the first embodiment comprises a motor 2 which generates torque by being energized, and an output shaft 3 which rotates in response to the torque of the motor 2. The starter 1 also comprises a pinion movable body (as will hereinafter be described in detail) which has a pinion gear 4 provided movably in the axial direction, a clutch 5 and a holder 6. The starter 1 further comprises a housing 7 which accommodates the pinion movable body inside, a seal component 8 which seals a gap between the pinion movable body and the housing 7, an electromagnetic switch 9 which opens and closes a main contact point (not shown) provided in a power circuit of the motor 2, a gearshift 10 which drives the pinion movable body to move in the direction of the output shaft 3 and so forth.

The motor 2 is a well-known DC motor which generates torque to an armature in response to supply of electric power from a battery in-vehicle (not shown) when the main contact point is closed by an operation to the electromagnetic switch 9.

The output shaft 3 is disposed on the same shaft line as the armature of the motor 2. An end part at the opposite side of the motor 2 in the shaft line is rotatably supported at the tip part of a nose part 7a provided in the housing 7 through a shaft bearing. The output shaft 3 is rotatable in response to the torque of the motor 2.

The pinion movable body comprises the pinion gear 4, the one way clutch 5 and the holder 6. The pinion movable body is provided in an inside of a nose part of the housing 7, and is provided movably in the direction of the output shaft 3 on the output shaft 3.

The pinion gear 4 is rotatably provided at an outer circumferential of the output shaft 3, and transmits torque to a ring gear 12. An inner part 4a is provided integrally with the pinion gear 4 at the opposite side of the ring gear 12 side in the shaft line. The inner part 4a constitutes a part of an after-mentioned one-way clutch 5.

The one-way clutch 5 fits to a helical spline formed in the outer circumferential of the output shaft 3, and is rotatably provided integrally with the output shaft 3. At the time of the engine starting, the drive torque of the motor 2 is transmitted to the pinion gear 4 through the inner part 4a. On the other hand, when the engine rotation is transmitted to the starter 1 by the engine starting, the input side (the motor 2 side) and the output sides (the pinion gear 4 side) of the one-way clutch 5 is separated and transmission of torque is interrupted so that the engine rotation may not be transmitted to the input side of the one-way clutch 5.

The holder 6 is formed in closed-end hollow cylindrical shape whose inner diameter is larger than the outer diameter of the one-way clutch 5, and is attached to the outer diameter side of the one-way clutch 5 from the opposite side of the pinion gear 4 so that the one-way clutch 5 may be accommodated inside. A round hole through which the output shaft 3 is inserted is formed in the center of the bottom of the holder 6. The inner circumferential surface of the holder 6 and the outer circumferential surface of the one-way clutch 5 are provided slidably to each other. The one-way clutch 5 and the holder 6 are provided so that relative rotation is possible, whereby the rotating speed of the holder 6 is restrained smaller than the rotating speed of the pinion gear 4, Moreover, a hook part 6a is formed in the inside of an opening of the holder 6. The holder 6 can move in an axial direction integrally with the one-way clutch 5 by hooking the hook part 6a to an end of the outer circumferential of the one-way clutch 5 by the snap fitting using elasticity. The gearshift 10 is extended and formed at the opposite side of the pinion gear 4 in the axial direction. A contact part 6b of the gearshift 10 is provided in the bottom side of the holder 6. The contact part 6b is formed in solid cylindrical shape, and its outer diameter is provided smaller than the portion in which the one-way clutch 5 of the holder 6 is accommodated. Moreover, a flange portion 6c is formed at the end of the contact part 6b. The tip part of the gearshift 10 is constituted so that it may enter into a gap between the flange portion 6c and the bottom of the holder 6. Furthermore, a baffle part 6d formed in the contact part 6b is projected radially outwards and is provided so that it may contact to the tip part of the gearshift 10. Here, the holder 6 is made of resin which has lubricity such as nylon etc.

A reduction gear may be arranged between the motor 2 and the pinion movable body. For a reduction gear, for example, an epicycle reduction gear which can be slowed down on the same axis of the armature of the motor 2 can be used.

The housing 7 fits to a case in which the motor 2 etc. are accommodated, and a nose part 7a having a space inside in which the pinion movable body moves is formed in the opposite side of the motor 2. Moreover, the electromagnetic switch 9 is attached in the housing 7.

The seal component 8 is a lip seal made of rubber for example, which has the shape of a ring, and an end of the outer circumferential is fixed inside of the nose part 7a of the housing 7. An end of the inner circumferential of the seal component 8 slidably contacts or comes close to (about 0.1-0.5 mm) the outer circumferential surface of the holder 6 whereby a foreign substance or water is prevented from infiltrating into the inside of the starter 1 from the opening of the housing 7. Even if the pinion movable body is in the same position as when the starter 1 is not in operation (refer to FIG. 1) to the position at the time when the starter 1 is in operation on the output axis 3 (refer to FIG. 2) on the output shaft 3, the seal component 8 is provided so that it may contact to or come close to the holder 6, and the seal of the gap between the housing 7 and the holder 6 is always carried out.

The electromagnetic switch 9 comprises an electromagnetic coil which is energized from the battery in-vehicle (not shown) by closing operation of a starting switch (not shown) and a plunger which moves inside the electromagnetic coil. When an electromagnet is formed by energizing the electromagnetic coil, the plunger is attracted to the electromagnet, so that the switch 9 closes the main contact point. On the other hand, when energization to the electromagnetic coil is stopped and attraction of the electromagnet disappears, the plunger is returned by reaction force stored in a return spring which is not shown, so that the switch 9 opens the main contact point.

One end of the gearshift 10 is connected with the plunger of the switch 9, and the other end of the gearshift 10 is engaged with the contact part 6b which is formed integrally with the holder 6. The gearshift 10 is interlocked with operation of the plunger and drives the pinion movable body to move in an axial direction.

Next, the operation of the starter 1 is explained.

When the starting switch is closed, the electromagnet is formed by the electromagnetic switch 9 energizing the electromagnetic coil. Then the plunger is attracted by the electromagnet and a motion of the plunger is transmitted to the pinion movable body through the gearshift 10. Then the pinion movable body is pushed out to the engine side (left-hand side of FIG. 1) while rotating on the output shaft 3 by the action of a helical spline, whereby the pinion gear 4 is moved into engagement with the ring gear 12.

On the other hand, when the main contact point of the power circuit of the motor 2 is closed by movement of the plunger, electric power is supplied to the motor 2 from the battery, whereby torque arises to the armature. Rotation of the armature is transmitted to the output shaft 3 through the one-way clutch 5 and the pinion gear 4 rotates integrally with the output shaft 3, whereby the drive torque of the motor 2 is transmitted to the ring gear 12 from the pinion gear 4 and the engine is cranked.

When the engine starts completely after cranking and opening operation of the starting switch is carried out, the energization to the electromagnetic coil is stopped and the attraction of the electromagnet disappears, whereby the plunger is put back by reaction force stored in the return spring. Consequently, the main contact point opens, the electric supply to the motor 2 from the battery is stopped, and rotation of the armature slows down gradually and stops.

Moreover, since the gearshift 10 will rock to a counter direction at the time of engine starting when the plunger is put back, by returning the pinion movable body to the opposite side of the engine (right direction in FIG. 1), the pinion gear 4 separates from the ring gear 12 and retreats to the stop position shown in FIG. 1.

Effect of First Embodiment

The holder 6 attached to the pinion movable body of the starter 1 of this embodiment is provided so that relative rotation of the holder 6 to the one-way clutch 5 is possible whereby the holder 6 is restrained so that it may rotate at a smaller rotation speed than that of the pinion gear 4. Furthermore, the baffle part which contacts the gear shaft 10 is formed to the holder 6 whereby the holder 6 is provided so that it cannot rotate against the housing 7. Then, the seal component 8 is interposed between the inner circumferential surface of the housing 7 and the outer circumferential surface of the holder 6, whereby wear of the seal component 8 can be markedly reduced compared with the case where the seal component 8 contacts the one-way clutch 5 which rapidly rotates. By this, the sealability which prevents a foreign substance or water from infiltrating into the inside of the starter 1 can be maintained for a long period of time whereby durability and reliability of the starter 1 can be improved.

Since the seal component 8 contacts or comes close to the holder 6 in the total range where the pinion movable body moves, the sealability can be maintained regardless of the operating state of the starter 1 whereby infiltration of a foreign substance or water from the outside to the inside of the starter 1 can be prevented certainly.

Moreover, the gearshift 10 drives the pinion movable body to move in axial direction through the holder 6 whereby wear of a tip part of the gearshift 10 can be reduced compared with the case where the seal component 8 contacts the one-way clutch 5 which rapidly rotates. For this reason, contact to the ring gear 12 of the pinion gear 4 can be made uniform, and also the durability of the gearshift 10 is improved.

By making up the holder 6 with resin which has the lubricity such as nylon, friction produced in relative rotation with the holder 6 and a rotation part of the pinion movable body can be reduced. For this reason, wear of the holder 6 can be reduced and durability of the holder 6 can be secured. Moreover, in the case where the holder is attached with a snap fitting using elasticity, the holder can be attached smoothly.

Second Embodiment

Figure 4:
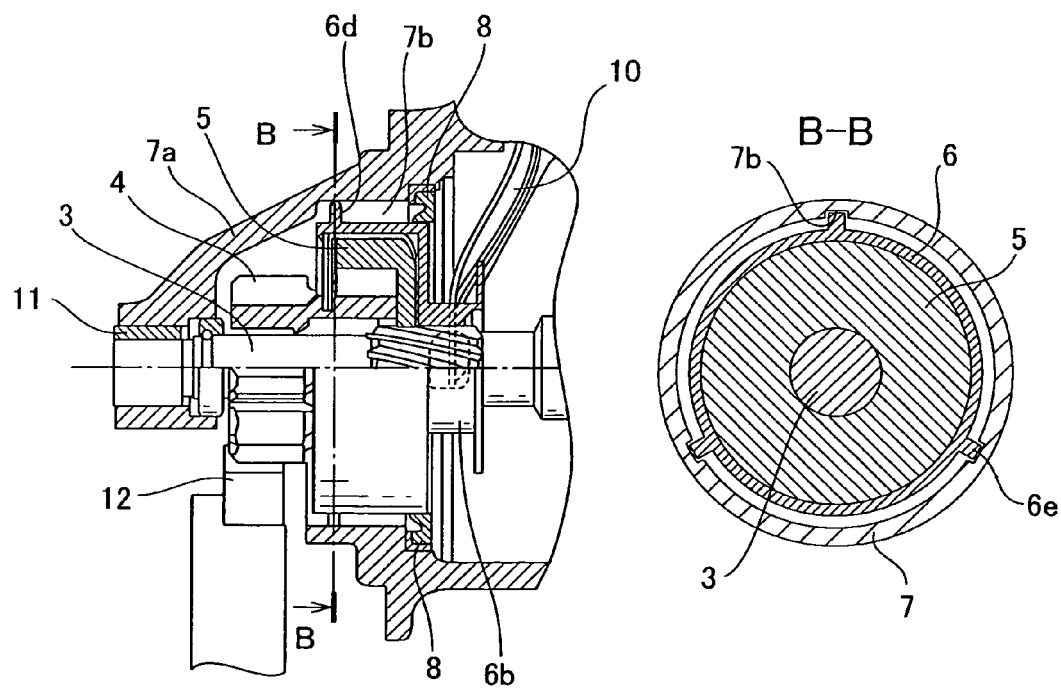
FIG. 4 is magnified view of the starter's principal part and its B-B sectional view, according to the second embodiment of the present invention.

The starter 1 of the second embodiment is explained using FIG. 4.

The starter 1 of this embodiment has two or more convex part 6e projected radially outwards in the outer circumferential surface of the opening of the holder 6. Moreover, a plurality of groove parts 7b which extend in the axial direction are formed in the inner circumferential surface of the nose part 7a of the housing 7, and the groove parts 7b are constituted so that the groove part 7b may engage to the convex part 6e.

By this, even if torque is transmitted to the holder 6, the convex part 6e engages the groove part 7b, whereby the holder 6 is restrained so that relative rotation of the holder 6 to the nose part 7a of the housing 7 is impossible. Moreover, the groove part 7b is extended in the axial direction and the convex part 6e is permitted to move in the axial direction along the groove part 7b, whereby extrusion of the pinion movable body is not restricted.

Third Embodiment

Figure 5:
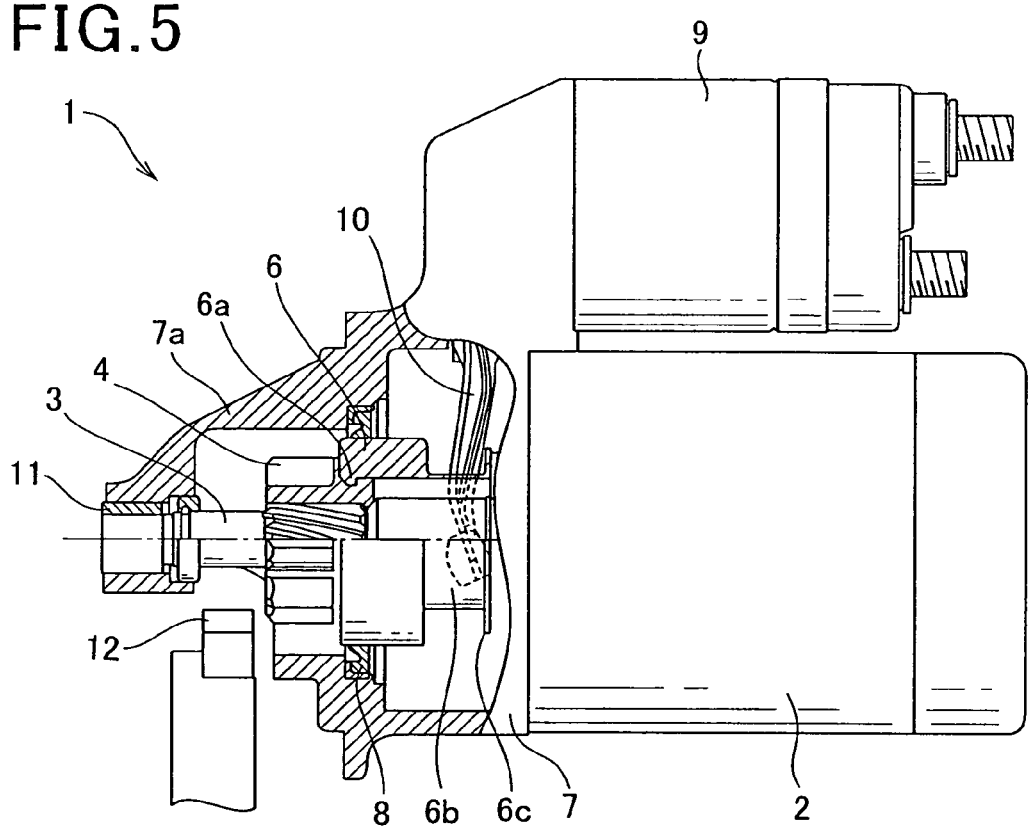
FIG. 5 is a sectional view at the time when the starter is not in operation, according to the third embodiment of the present invention.

The starter 1 of the third embodiment is explained using FIG. 5.

With the starters 1 of the first and second embodiments, the pinion movable body in which the pinion gear 4 and the one-way clutch 5 are united moves on the output shaft 3. On the contrary, with the starter 1 of this embodiment, the pinion gear 4 and the one-way clutch 5 are provided separately and only the pinion gear 4 moves on the output shaft 3.

With this type of the starter 1, the holder 6 is attached to the pinion gear 4. In the inside of the opening of the holder 6, a hook part 6a is formed and the hook part 6a engages by the snap fitting using elasticity with a concave part which is formed at the opposite side of a gear of the pinion gear 4, whereby the holder 6 can move in the axial direction integrally with the pinion gear 4. In addition, the pinion gear 4 and the holder 6 are provided so that relative rotation is possible.

Accordingly, in the starter of the type in which only the pinion gear 4 moves on the output shaft 3 also, by providing the holder 6, the effect which reduces wear of the seal component is acquired as well as the first embodiment.

Other composition and effects are the same as the first embodiment.

Fourth Embodiment

Figure 6:
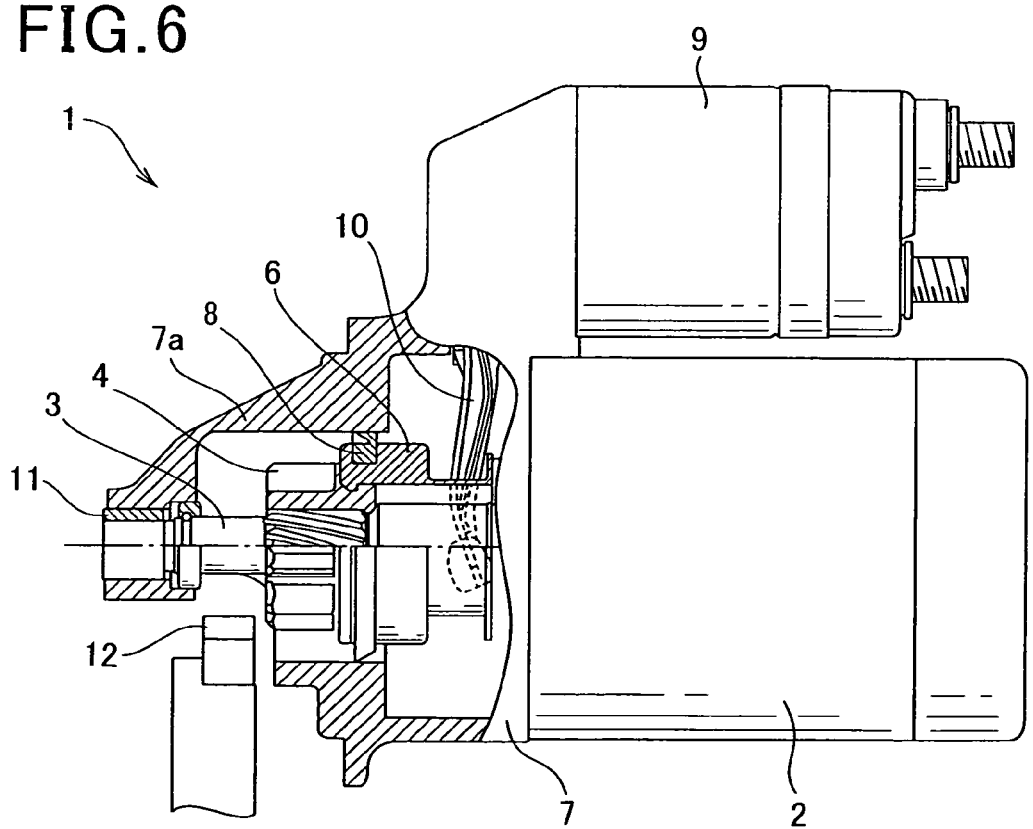
FIG. 6 is a sectional view at the time when the starter is not in operation, according to the fourth embodiment of the present invention.

The starter 1 of the fourth embodiment is explained using FIG. 6.

The starter 1 of this embodiment is a type in which only the pinion gear 4 moves on the output shaft as well as the third embodiment. With the starters 1 of the first-third embodiments, the end of the outer circumferential of the seal component 8 is fixed to the inside of the nose part 7a of the housing 7. On the contrary, with the starter 1 of this embodiment, the end of the inner circumferential of the seal component 8 is fixed to the outside of the holder 6. The end of the outer circumferential of the seal component 8 slidably contacts or comes close to (about 0.1-0.5 mm) the inside surface of the nose part 7a whereby a foreign substance or water is prevented from infiltrating into the inside of the starter 1 from the opening of the housing 7.

In addition, the starter of the type in which the pinion gear 4 and the one-way clutch 5 integrally move on the output shaft also can have composition which fixes the seal component 8 to the holder 6 as same as the fourth embodiment.

Other composition and effects are the same as the first embodiment.

Fifth Embodiment

Figure 7:
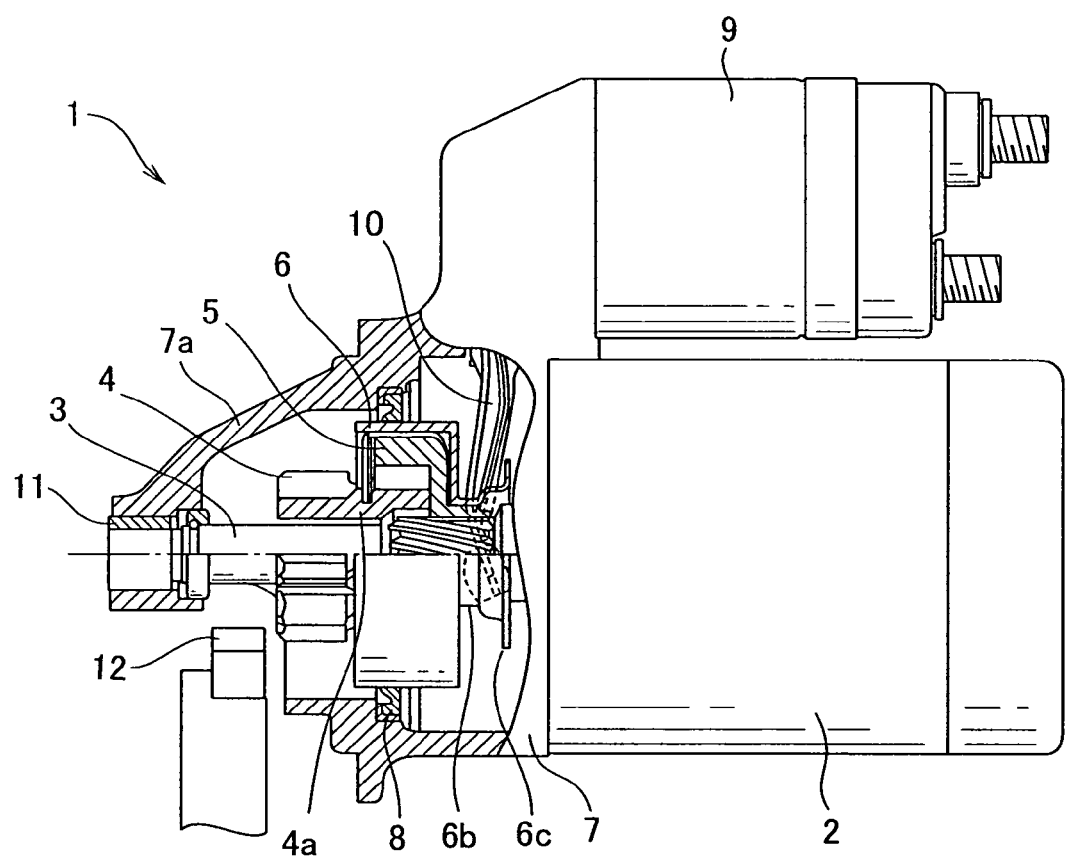
FIG. 7 is a sectional view at the time when the starter is not in operation, according to the fifth embodiment of the present invention.

The starter 1 of the fifth embodiment is explained using FIG. 7.

With the starters 1 of the first-fourth embodiments, the holder 6 moves in the axial direction integrally with the one-way clutch 5 by the snap fitting using the hook part 6a formed in the inside of the opening of the holder 6. On the contrary, with the starter 1 of this embodiment, the holder 6 can move in the axial direction integrally with the one-way clutch 5 by providing C ring or the like at the end of the contact part 6b of the holder 6.

In addition, with the starter of the type in which only the pinion gear 4 moves on the output shaft like the third and fourth embodiment, the holder 6 also can be attached with the C ring or the like.

Other composition and effects are the same as the first embodiment.

What is claimed is:

1. A starter, comprising:
   a motor that generates torque by being energized;
   an output shaft that rotates in response to the torque of the motor;
   a pinion movable body that includes a pinion gear provided on the output shaft so that axial movement is possible;
   a housing that accommodates the pinion movable body inside; and
   a seal component that seals a gap between the pinion movable body and the housing, wherein
   the pinion gear is pushed towards a ring gear and then engages with the ring gear whereby an engine is cranked;
   the pinion movable body includes a holder in the outer diameter side of the pinion movable body and rotation of the holder is restrained so that the rotating speed of the holder is smaller than the rotating speed of the pinion gear whereby relative rotation between the pinion movable body and the pinion gear is possible;
   the seal component is interposed between an inner circumferential surface of the housing and an outer circumferential surface of the holder;
   the pinion movable body is driven by a gearshift to move the output shaft in an axial direction, and a tip part of the gearshift contacts the holder; and
   a baffle part is formed in a contact part of the holder and the gearshift and the tip part of the gearshift contacts the contact part.

2. The starter according to claim 1, wherein the seal component is made to always seal the gap between the housing and the holder even when the pinion movable body moves in the direction of the output shaft.

3. The starter according to claim 1, wherein the holder is made up of resin which has lubricity.

4. The starter according to claim 1, wherein
   the holder comprises a convex part projected radially outwards and, in the inner circumferential surface of the housing, a groove part extends in the axial direction and the groove part engages with the convex part.

5. A starter, comprising:
   a motor that generates torque by being energized;
   an output shaft that rotates in response to the torque of the motor;
   a pinion movable body that includes a pinion gear provided on the output shaft so that axial movement is possible;
   a housing that accommodates the pinion movable body inside; and
   a seal component that seals a gap between the pinion movable body and the housing, wherein
   the pinion gear is pushed towards a ring gear and then engages with the ring gear whereby an engine is cranked;
   the pinion movable body includes a holder in the outer diameter side of the pinion movable body and rotation of the holder is restrained so that the rotating speed of the holder is smaller than the rotating speed of the pinion gear whereby relative rotation between the pinion movable body and the pinion gear is possible;
   the seal component is interposed between an inner circumferential surface of the housing and an outer circumferential surface of the holder; and
   the holder comprises a convex part projected radially outwards and, in the inner circumferential surface of the housing, a groove part extends in the axial direction and the groove part engages with the convex part.

6. The starter according to claim 5, wherein the seal component is made to always seal the gap between the housing and the holder even when the pinion movable body moves in the direction of the output shaft.

7. The starter according to claim 5, wherein the holder is made up of resin which has lubricity.

8. The starter according to claim 5, wherein
   a baffle part is formed in a contact part of the holder and the gearshift and the tip part of the gearshift contacts the contact part.

9. A starter, comprising:
   a motor that generates torque by being energized;
   an output shaft that rotates in response to the torque of the motor;
   a pinion movable body that includes a pinion gear provided on the output shaft so that axial movement is possible;
   a housing that accommodates the pinion movable body inside; and
   a seal component that seals a gap between the pinion movable body and the housing, wherein
   the pinion gear is pushed towards a ring gear and then engages with the ring gear whereby an engine is cranked;

the pinion movable body includes a holder in the outer diameter side of the pinion movable body and rotation of the holder is restrained so that the rotating speed of the holder is smaller than the rotating speed of the pinion gear whereby relative rotation between the pinion movable body and the pinion gear is possible;

the seal component is interposed between an inner circumferential surface of the housing and an outer circumferential surface of the holder;

the pinion movable body is driven by a gearshift to move the output shaft in an axial direction, and a tip part of the gearshift contacts the holder; and the holder comprises a convex part projected radially outwards and, in the inner circumferential surface of the housing, a groove part extends in the axial direction and the groove part engages with the convex part.

10. The starter according to claim 9, wherein the seal component is made to always seal the gap between the housing and the holder even when the pinion movable body moves in the direction of the output shaft.

11. The starter according to claim 9, wherein the holder is made up of resin which has lubricity.

12. The starter according to claim 9, wherein a baffle part is formed in a contact part of the holder and the gearshift and the tip part of the gearshift contacts the contact part.

* * * * *